US012399836B2

(12) United States Patent
Connelly et al.

(10) Patent No.: US 12,399,836 B2
(45) Date of Patent: Aug. 26, 2025

(54) TRANSLATION LOOKASIDE BUFFER SOFTWARE MONITOR

(71) Applicant: Rockwell Collins, Inc., Cedar Rapids, IA (US)

(72) Inventors: John M. Connelly, Cedar Rapids, IA (US); Nisar Ahemad Naikwadi, Cedar Rapids, IA (US); Joseph A. Steffen, Cedar Falls, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 32 days.

(21) Appl. No.: 18/432,617

(22) Filed: Feb. 5, 2024

(65) Prior Publication Data
US 2024/0289280 A1 Aug. 29, 2024

Related U.S. Application Data

(60) Provisional application No. 63/448,811, filed on Feb. 28, 2023.

(51) Int. Cl.
G06F 12/1027 (2016.01)
G06F 11/07 (2006.01)
G06F 12/1009 (2016.01)

(52) U.S. Cl.
CPC ........ *G06F 12/1027* (2013.01); *G06F 11/073* (2013.01); *G06F 12/1009* (2013.01); *G06F 2212/1032* (2013.01)

(58) Field of Classification Search
CPC ............. G06F 12/1027; G06F 12/1009; G06F 11/073; G06F 2212/1032
See application file for complete search history.

(56) References Cited

U.S. PATENT DOCUMENTS

| 5,940,872 A | 8/1999 | Hammond et al. |
| 6,266,755 B1 | 7/2001 | Yeager |
| 6,587,937 B1 | 7/2003 | Jensen et al. |
| 6,718,494 B1 | 4/2004 | Jamil et al. |
| 7,263,631 B2 | 8/2007 | Vanburen |
| 7,340,574 B2 | 3/2008 | Hall et al. |
| 7,415,633 B2 | 8/2008 | Jamil et al. |
| 7,607,167 B1 | 10/2009 | Johnson et al. |
| 7,676,608 B1 | 3/2010 | Crosmer et al. |
| 7,779,254 B1 | 8/2010 | Crosmer et al. |

(Continued)

OTHER PUBLICATIONS

ARM Cortex-A Series, Version 4.0; Programmer's Guide, ARM Copyright 2011-2013; published Jan. 22, 2014.

(Continued)

*Primary Examiner* — Reginald G Bragdon
*Assistant Examiner* — Zakaria Mohammed Belkhayat
(74) *Attorney, Agent, or Firm* — Suiter Swantz IP

(57) ABSTRACT

A microprocessor is described. The microprocessor includes a software-based monitor for detecting TLB corruptions. The TLB corruptions contribute to undetected erroneous upset rate of the microprocessor. The software monitor detects errors in the TLB. The software-based monitor detects TLB corruptions in microprocessors where hardware protection mechanisms are not available. The software monitor mitigates single event effects due to atmospheric particles and improves the safety of high integrity computing products.

17 Claims, 7 Drawing Sheets

(56) References Cited

U.S. PATENT DOCUMENTS

| | | | |
|---|---|---|---|
| 8,429,135 B1 * | 4/2013 | Lang | G06F 11/1064 707/687 |
| 8,489,846 B1 | 7/2013 | Jensen et al. | |
| 8,489,919 B2 | 7/2013 | Clark et al. | |
| 9,405,515 B1 | 8/2016 | Bertram et al. | |
| 9,652,315 B1 | 5/2017 | Aquino et al. | |
| 9,806,885 B1 | 10/2017 | Breitbach et al. | |
| 9,812,221 B1 | 11/2017 | Hagen et al. | |
| 9,846,784 B1 | 12/2017 | Murray et al. | |
| 10,114,777 B1 | 10/2018 | Owen et al. | |
| 10,242,179 B1 | 3/2019 | Corbett et al. | |
| 10,635,602 B2 | 4/2020 | Gschwind et al. | |
| 10,664,325 B1 | 5/2020 | Radack et al. | |
| 10,761,983 B2 | 9/2020 | Gschwind et al. | |
| 11,048,548 B1 | 6/2021 | Polley et al. | |
| 11,367,499 B2 | 6/2022 | Thommana et al. | |
| 11,392,514 B2 | 7/2022 | Reubold | |
| 11,500,711 B1 | 11/2022 | Kolesinski et al. | |
| 11,520,705 B1 | 12/2022 | Henning et al. | |
| 2006/0075236 A1 | 4/2006 | Marek et al. | |
| 2006/0150048 A1 | 7/2006 | Echeruo et al. | |

OTHER PUBLICATIONS

European Patent Office, Extended European Search Report received in EP Application No. 24160390.1, Jul. 25, 2024, 6 pages.
Sanchez-Macian et al., "Enhancing Instruction TLB Resilience to Soft Errors," IEEE Transactions on Computers, vol. 69, No. 2, Feb. 2019, 11 pages.

* cited by examiner

TRANSLATION LOOKASIDE BUFFER SOFTWARE MONITOR

CROSS REFERENCE TO RELATED APPLICATION

The present application claims the benefit under 35 U.S.C. § 119(e) of U.S. Provisional Application Ser. No. 63/448,811, filed Feb. 28, 2023, titled "TRANSLATION LOOKASIDE BUFFER SOFTWARE MONITOR", which is incorporated herein by reference in the entirety.

TECHNICAL FIELD

The present invention generally relates to address translation, and more specifically to address translation using a translation lookaside buffer.

BACKGROUND

Avionics equipment operates in an environment with a high rate of atmospheric neutrons. The significant improvements in the reliability of silicon (leading to hard failures) in modern integrated circuits (ICs) means soft errors have become the largest contributor to the expected failure rates of avionics hardware. Commercially of the shelf (COTS) processors may be used in atmospheric environments. However, the COTS processor may not be designed for the atmospheric environments. In this regard, the COTS processors may not have protection mechanisms provided in hardware. Therefore, it would be advantageous to provide a device, system, and method that cures the shortcomings described above.

SUMMARY

A microprocessor is described, in accordance with one or more embodiments of the present disclosure. In some embodiments, the microprocessor includes a memory management unit (MMU) comprising a page table and a translation lookaside buffer (TLB). The page table maps virtual memory to physical memory. The TLB comprises entries from the page table. Each of the entries comprises descriptors. The TLB is maintained in non-error correcting code (ECC) memory. The MMU is configured according to a plurality of MMU configuration parameters. In some embodiments, the microprocessor includes a cache comprising a software monitor function. In some embodiments, the microprocessor includes one or more CPU cores configured to execute the software monitor function. In some embodiments, the software monitor function causes the one or more CPU cores to copy the descriptors from the TLB to ECC memory. In some embodiments, the software monitor function causes the one or more CPU cores to determine a valid bit of the descriptor is set. In some embodiments, the software monitor function causes the one or more CPU cores to compare the descriptors in the ECC memory with the plurality of MMU configuration parameters to determine whether the TLB has a soft error.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
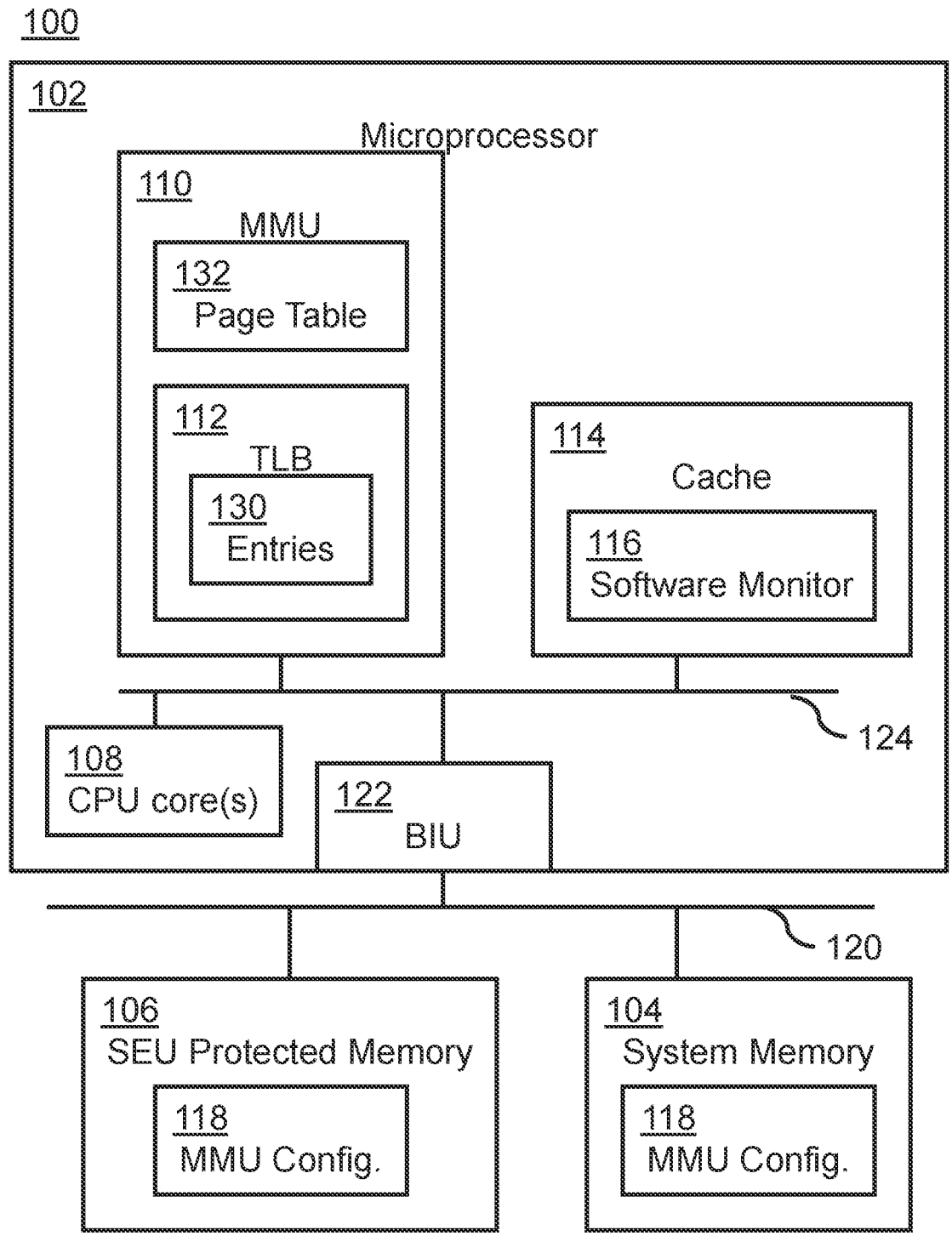
FIG. 1A depicts block diagram of a microprocessor, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a software-based monitor for detecting TLB corruptions where hardware protection mechanisms are not available. The software monitor examines the TLB descriptors periodically to determine the validity of the descriptors, examines fields in the descriptor, and performs a comparison to the MMU configuration parameters. If a mis-compare between the decoded descriptor and the expected MMU configuration is detected, the monitor will report a fault. Since the fault event is considered unrecoverable (i.e., there is no way to detect how far the error may have propagated in the system), the processor should be reset. In the event that a corrupted descriptor is detected, the processor core will be reset. The reset will contribute to the loss-of-function rate but will also remove the TLB contribution to erroneous data.

U.S. Pat. No. 5,940,872, titled "Software and hardware-managed translation lookaside buffer", filed on Nov. 1, 1996; U.S. Pat. No. 6,587,937, titled "Multiple virtual machine system with efficient cache memory design", filed on Mar. 31, 2000; U.S. Pat. No. 7,263,631, titled "Soft error detection and recovery", filed on Aug. 13, 2004; U.S. Pat. No. 7,415,633, titled "Method and apparatus for preventing and recovering from TLB corruption by soft error", filed on Dec. 22, 2000; U.S. Pat. No. 8,429,135, titled "Processor fault tolerance through translation lookaside buffer refresh", filed on Jun. 11, 2009; U.S. Pat. No. 8,489,846, titled "Partition processing system and method for reducing computing problems", filed on Jun. 24, 2005; are incorporated herein by reference in the entirety.

Several terms are now defined.
BIU: Bus Interface Unit
COTS: Commercial Off-The-Shelf
CPU: Central Processing Unit
DRAM: Dynamic random-access memory
ECC: Error Correcting Code
MMU: Memory Management Unit
ROM: Read only memory (ROM)
SEU: Single-event upset
SRAM: Static random-access memory
TLB: Translation Lookaside Buffer Referring now to FIGS. 1A-1C, a computer system 100 is described, in accordance with one or more embodiments of the present disclosure. The computer system 100 may include one or more of a microprocessor 102, a system memory 104, a SEU protected memory 106, one or more buses 120, and the like.

The system memory 104 may be external to the microprocessor 102. The system memory 104 may also be referred to as physical memory. The system memory 104 may include any type of memory, such as, but not limited to, dynamic random-access memory (DRAM), static RAM (SRAM), flash memory, and the like. In embodiments, the system memory 104 may be error correction coding (ECC) memory. The ECC memory may use an error correction code to detect and correct bit data corruption. For example, the computer system 100 may be used in a high integrity application and may include ECC protected system memory.

In embodiments, the system memory 104 may maintain master page tables. The master page tables may include an MMU configuration 118, as will be described further herein.

In embodiments, the computer system 100 includes SEU protected memory 106. The SEU protected memory 106 may maintain a copy of the MMU configuration 118.

The buses 120 may couple one or more components of the computer system 100 such as, but not limited to, the microprocessor 102, system memory 104, SEU protected memory 106. The buses 120 may also be referred to as an external bus and/or a system bus.

The microprocessor 102 is now described. The microprocessor 102 may include one or more Central Processing Unit (CPU) cores 108, memory management unit (MMU) 110, cache 114, bus interface unit (BIU) 122, internal buses 124, and the like.

The bus interface unit 122 may couple the microprocessor 102 to the external buses 120. The CPU cores 108, MMU 110, cache 114, and BIU 122 may be coupled by the internal buses 124 of the microprocessor 102. As may be understood, the computer system 100 is not intended to be limited to the architecture of the external buses 120 and the internal buses 124.

The microprocessor 102 may include any number of the CPU cores 108. The CPU cores 108 may execute software instructions maintained in the cache 114.

The cache 114 may be on-chip cache memory. Data may be written into the cache 114. Data may also be read from the cache 114. The data may be read from the cache 114 at a relatively high speed, as compared to the relatively slow speed of reading from the system memory 104. The cache 114 may also be referred to as a primary cache or a level one (L1) cache, although this is not intended to be limiting.

In embodiments, the cache 114 may include a software monitor 116 function. The software monitor 116 may implement one or more methods, as will be described further herein. Although the cache 114 is described as including the software monitor 116, this is not intended as a limitation of the present disclosure. In embodiments, the software monitor 116 may be executed from a memory location outside of the microprocessor 102. For example, the software monitor 116 may be executed directly from the system memory 104, from the SEU protected memory 106, or the like.

Figure 1B:
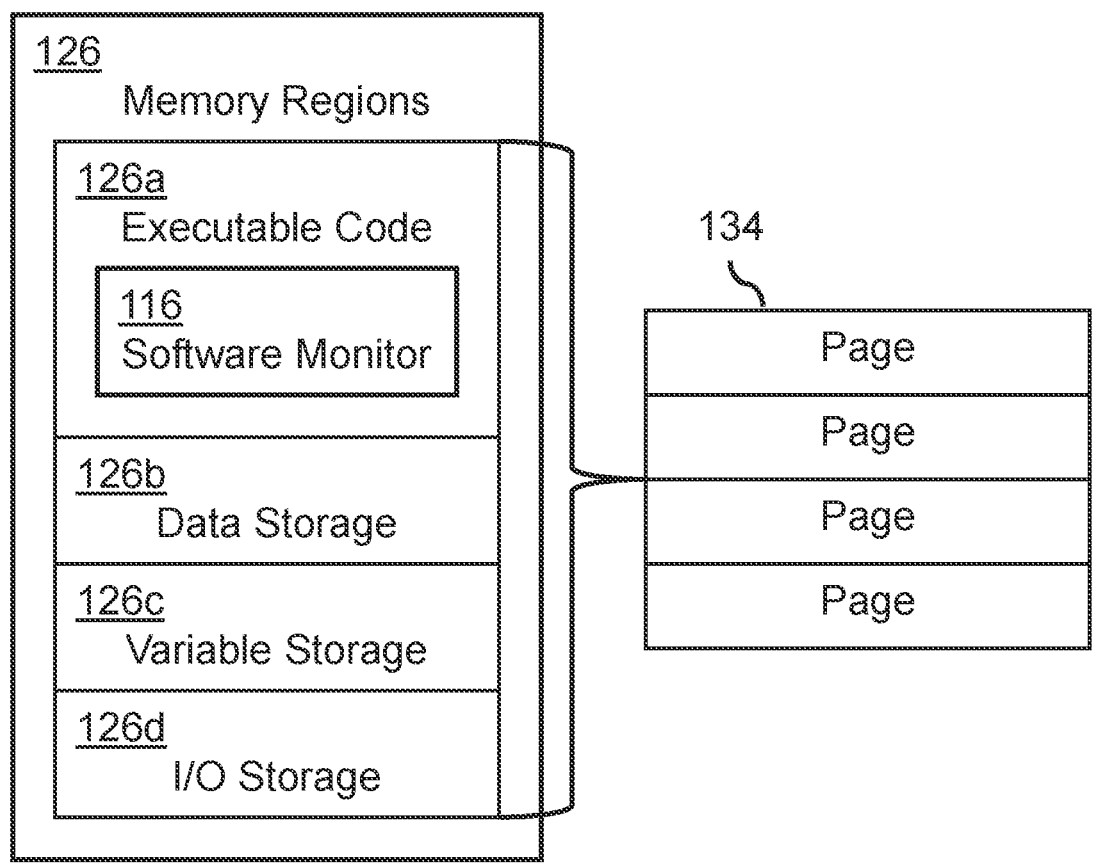
FIG. 1B depicts a cache including memory regions, in accordance with one or more embodiments of the present disclosure.

As depicted in FIG. 1B, the cache 114 may include one or more memory regions 126. For example, the memory regions 126 of the cache 114 may include, but are not limited to, regions for executable code 126a, data storage 126b, variable storage 126c, I/O storage 126d, and the like. The software monitor 116 may be maintained in the executable code 126a region. The data storage 126b, variable storage 126c, and the I/O storage 126d may not be executable.

In embodiments, each of the memory regions 126 may be broken into pages 134. Each of the memory regions 126 may include any number of the pages 134. The pages 134 may include a size. For example, the size of the pages 134 may be 4 KB, 2 MB, or the like. The pages 134 may be configured with configuration parameters (e.g., permissions). Each page 134 in a common memory region may include the same configuration parameters. However, each of the pages 134 in the common memory region may include a different offset.

In embodiments, the microprocessor 102 includes the MMU 110. The MMU 110 may be implemented in SRAM or the like. The MMU 110 may include a page table 132 mapping virtual memory to physical memory. The physical memory may be in system memory 104 or the like. The MMU 110 may perform a page table walk to find a page in system memory 104 containing the associated address and perform virtual address to physical address translation. The MMU 110 handles address translation between virtual addresses and physical addresses. The physical address may be in the system memory 104 or the like. In embodiments, the MMU 110 may include a multi-level page table.

The MMU 110 may be configured based on a MMU configuration 118. The MMU configuration 118 may set the bits (e.g., descriptors) for a particular address. The MMU configuration 118 is stored in ECC memory. The ECC protected memory may be ROM or RAM. For example, the MMU configuration 118 may be stored in non-volatile memory (e.g., flash) and/or in system memory 104 (e.g., ECC protected memory). The MMU configuration 118 may be maintained in the system memory 104 and/or in the SEU protected memory 106. The MMU configuration 118 may be retrieved from the system memory 104 and/or in the SEU protected memory 106 during initialization of the microprocessor 102. The MMU 110 may be configured during the initialization of the microprocessor 102 using the MMU configuration 118 in response to retrieving the MMU configuration 118. The MMU 110 is configured with memory type and permissions for each defined memory region in a memory map of the microprocessor 102. The MMU configuration 118 also maps the virtual memory address range to the physical addresses in the system memory 104.

The MMU 110 may include a Translation Lookaside Buffer (TLB) 112. The TLB 112 may be a cache inside of the MMU 110. The TLB 112 may include recently accessed page translations from the page table 132 of the MMU 110. A subset of the most recently used page tables 132 may be cached in the TLB 112. The MMU 110 may access the TLB 112 for fast access to the most recently used page tables 132. The TLB 112 may be a cache for virtual address translation. In particular, the TLB 112 may be a cache of recently executed page translations within the MMU 110. The TLB 112 may include recent page table entries. The entries 130 in the TLB 112 may provide fast conversion from a virtual address to a physical address, without needing to perform the page table walk of the MMU 110. The TLB 112 may comprise an array of the entries 130 that map a virtual address region to a corresponding physical address region. The array of the entries 130 may include the most recently used physical address regions. When the CPU cores 108 access a virtual address, the TLB 112 may searched for the page containing the virtual address. If the page is found in the TLB 112, address translation may be performed and the physical address may be accessed. If the page is not found, the MMU 110 may perform the page table walk.

In embodiments, the TLB 112 may be maintained in non-error correcting code (ECC) memory. In this regard, the entries 130 of the TLB 112 may be subject to soft errors, as will be described further herein.

The number of the entries 130 in the TLB 112 may be based on the architecture of the microprocessor 102. For example, the cache may include between 64 and 256 of the entries 130, although this is not intended to be limiting. Generally, the TLB 112 may include any number of the array of the entries 130, such that the exemplary range is not intended to be limiting.

The entries 130 may be added and removed from the TLB 112 using a replacement algorithm. The replacement algorithm may be utilized to replace an existing page with the page found during the table walk after the MMU 110 performs the page table walk. In this regard, the new pages may be added when the new page is not found in the current array of entries in the TLB 112. The replacement algorithm may include, but is not limited to, Least Recently Used (LRU), random, First-In First-Out (FIFO), and the like.

Each entry 130 of the TLB 112 may include a number of bits. The bits in each entry 130 may include one or more descriptors 128. The descriptors 128 may also be referred to as TLB descriptor, attributes, or TLB attributes. The bits of the descriptors 128 may be predefined for each address level. The bits in the descriptors 128 should match the bits in the MMU configuration 118 when the TLB 112 is not corrupted due to soft error. The specifics regarding the position of and the number of the bits of the descriptors 128 may be based on the architecture of the microprocessor 102. In some embodiments, the descriptors 128 may be configured according to the ARM™ descriptors (e.g., Cortex-A descriptors), although this is not intended to be limiting.

Figure 1C:
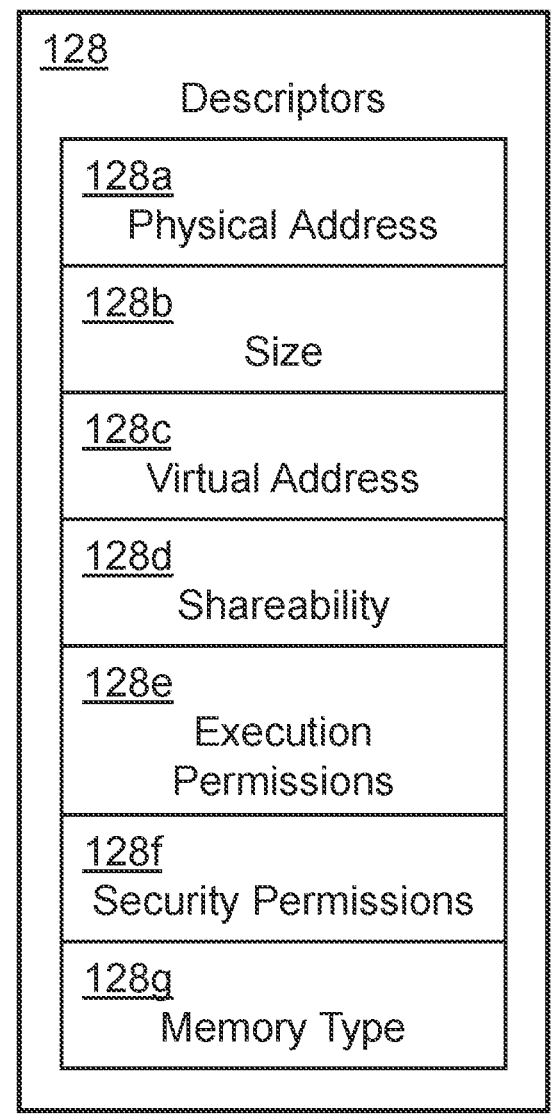
FIG. 1C depicts entries of a translation lookaside buffer including descriptors, in accordance with one or more embodiments of the present disclosure.

As depicted in FIG. 1C, the entries 130 in the TLB 112 may include one or more descriptors 128. The descriptors 128 may include, but are not limited to, physical address 128a, size 128b, virtual address 128c, shareability 128d, execution permissions 128e, security permissions 128f, memory type 128g, and the like. Although the descriptors 128 are described as including the shareability 128d and the security permissions 128f, this is not intended as a limitation of the present disclosure. For example, the security permissions may or may not be defined. By way of another, the CPU cores may include a single core. The shareability may then not be defined. The physical address 128a, size 128b, virtual address 128c, execution permissions 128e, and memory type 128g may be mandatory. The definition of the descriptors 128 may be performed by the manufacturer of the microprocessor 102. For example, the descriptors 128 may be defined according to one or more standards from ARM™, PowerPC™, Intel™, and the like.

The physical address 128a may represent data from elsewhere in a memory map of the microprocessor 102. For example, the physical address 128a may represent data from the system memory 104 or external devices connected to the BIU 122. The virtual address 128c may also be referred to as a logical address. The shareability 128d may be bits of the translation table entry which give permission to share the pages. The execution permissions 128e may be bits of the translation table entry which give permission to execute software. The security permissions 128f may also be referred to as access permissions. The security permissions 128f may be bits in the translation table entry which give access permissions for a page. The memory type 128g may be bits of the translation table entry that describes the type of the memory (e.g., the type of the system memory 104). The memory type 128g may also describe a memory regions cache-ability and/or allocation policy.

Soft errors are now described. Soft errors may refer to bit flipping (i.e., the unintended flipping of a bit). Soft errors may also be referred to as bit corruption. Soft errors may be recoverable by performing a reset and/or rewriting the bit errors. Bits in the TLB 112 may be corrupted due to the soft error.

The soft errors may be caused by one or more sources. For example, the soft errors may be due to single-event upset (SEU). SEU may refer to radiation-induced errors. The radiation-induced errors may be caused by charged particles (usually from the radiation belts or from cosmic rays) ionizing the medium through which they pass, leaving behind a wake of electron-hole pairs. SEU may be relatively more common in avionics and/or space applications, although this is not intended to be limiting. SEU may also occur in terrestrial applications. Although the soft errors are described as being caused by SEU, this is also not intended to be limiting.

In embodiments, the TLB 112 may be susceptible to the soft errors. The soft errors may be induced in the TLB 112 due to atmospheric neutron incidence with the TLB (e.g., atmospheric neutron incidence with SRAM). The longer an entry remains in the TLB 112, the more susceptible the entry is to soft errors due to SEU corruption. Descriptors related to common code blocks or frequently used data are expected to remain in the TLB 112 for long periods of time. The descriptors may remain in the TLB 112 even in applications where multiple threads, partitions, or context changes are executed at regular intervals. A portion of the TLB descriptors may remain static. The static descriptors may have a high probability of the soft errors. The percent of persistent TLB entries must be considered when determining the probability of data/instruction corruption.

The soft errors in the TLB 112 may lead to undetected erroneous operation of the microprocessor 102 and/or the transmission of undetected erroneous data on the buses 120. For example, at least the following scenarios may occur when a bit in an entry of the TLB 112 is corrupted by a soft error: a hit with corrupted Physical Address or Memory Attributes, a Pseudo-miss, and/or Pseudo-hit.

A Hit with corrupted Physical Address or Memory Attributes is now described. The Virtual Address of an operation is correctly matched to a TLB entry (hit), but the corresponding Physical Address or memory attributes have been corrupted. The impact would vary depending on whether the transaction was accessing data vs instructions. In the case of instructions, a page worth of instructions would be incorrect, resulting in invalid instruction abort (page contains data not code), prefetch abort (page does not have execute permissions), or ultimately trip a processor watchdog monitor. In the case where the Virtual Address corresponded to data, erroneous operation could occur when the incorrect data is fetched from main memory.

A Pseudo-miss is now described. A TLB entry's virtual address is corrupted and causes a miss when the virtual address would otherwise have matched to a physical address. The miss forces a page table entry to be fetched from main memory. The miss does not result in erroneous operation. However, the miss increases processor latency significantly (up to 100× slower). The miss may also impact deterministic execution of the microprocessor 102. For example, a Worst-Case Execution Time may take longer than expected.

A Pseudo-hit is now described. A corrupted TLB entry incorrectly results in a Virtual Address match, where the Physical Address in the table entry does not in fact correspond to that Virtual Address. The result is the same as the Hit with corrupted Physical Address or Memory Attributes scenario where a hit occurs but the physical address or memory attributes have been corrupted, causing erroneous execution or data.

Methods to reduce the impact of the soft errors on the TLB 112 are now described. The methods may include disabling the TLB 112, providing a hardware-based protection mechanisms in the microprocessor 102, and providing a software monitor 116 in the microprocessor 102. Much of the present disclosure is directed to the software monitor 116.

In embodiments, the TLB 112 may be disabled. The TLB 112 may be disabled to prevent the soft errors. However, disabling the TLB 112 may result in performance impacts to the microprocessor 102. The performance impacts may be so significant as to render the microprocessor 102 practically unusable. For example, access times to the TLB 112 are generally on the order of 1 core clock cycle compared to approximately 100 core clock cycles to access system memory. Disabling the TLB 112 has unacceptable performance impacts on the microprocessor 102 and is not a practical mitigation in a high-performance embedded system. Therefore, it is desirable to implement a feature in the microprocessor 102 to address the soft errors without disabling the TLB 112.

In embodiments, the microprocessor 102 includes hardware-based protection mechanisms. The hardware-based protection mechanisms may detect and/or correct for the soft error. For example, the hardware-based protection mechanisms may include, but are not limited to, parity or ECC. However, not all microprocessors may not include the hardware-based protection mechanisms for the MMU 110 and/or the TLB 112. Therefore, it may be desirable to implement a software function to address the soft errors in the TLB 112.

In embodiments, the microprocessor 102 may include a software monitor 116. The software monitor 116 is a software replacement for ECC in the TLB 112. The software monitor 116 may be further understood with reference to the various methods described further herein. The CPU cores 108 may execute the software monitor 116. The software monitor 116 is a software function which detects the soft errors in the TLB 112. The software monitor 116 may be particularly advantageous to detect the soft errors in the TLB 112 where the microprocessor 102 does not include the hardware-based protection mechanisms. The software monitor 116 may examine the descriptors 128 to determine the validity of the descriptors. The software monitor 116 may periodically examine the descriptors 128 to determine the validity. The software monitor 116 may detect that one or more of the descriptors 128 has a soft error.

In embodiments, the software monitor 116 may run as a background task on the CPU cores 108. In this regard, the software monitor 116 may be run in parallel with and not impact a main processor execution thread. For example, the software monitor 116 may run as a background task as part of a health monitor function. For instance, the software monitor 116 may run as a 20 Hz background thread, although this is not intended to be limiting.

Soft error handling is now described. The soft error handling is performed in response to the software monitor 116 detecting that one or more of the descriptors 128 has the soft error. The software may determine what to do after the error. The error may be considered a fatal flaw. In this regard, the microprocessor may be unsure what errors occurred and when. For example, erroneous data may be stored in memory region of which the microprocessor may be unaware. To ensure there is no residual erroneous data, reset the microprocessor. In embodiments, the microprocessor 102 may be rebooted or reset in response detecting that one or more of the descriptors 128 has the soft error. Rebooting the microprocessor may get the microprocessor back into a known state. The reset will contribute to the loss-of-function rate. However, the reset will remove the soft errors in the TLB as contributing to erroneous data. The microprocessor 102 may be prevented operating erroneously in response to detecting the soft errors in the TLB 112. Although the microprocessor 102 is described as being rebooted or reset, this is not intended as a limitation of the present disclosure. In embodiments, the microprocessor 102 may flush the MMU 110, the TLB 112, and/or the cache 114 in response to detecting that one or more of the descriptors 128 has the soft error. The MMU 110, the TLB 112, and/or the cache 114 may then be refilled from the system memory 104.

Various applications of the computer system 100 are now described. In embodiments, the computer system 100 may be a computer system used in avionics and/or space applications. For example, the computer system 100 may be a flight display (e.g., flight display 204), an avionic panel, flight control computer, and the like. The avionics and/or space applications may require medium to high integrity operation of the computer system 100. The software monitor 116 may advantageously allow the computer system 100 to achieve the medium to high integrity operation by detecting the soft errors of the TLB 112. Although the computer system 100 is described as being used in avionics and/or space applications, this is not intended as a limitation of the present disclosure. It is contemplated that the computer system 100 may be used in any number of applications to detect soft errors of the TLB 112 using the software monitor 116.

Figure 2:
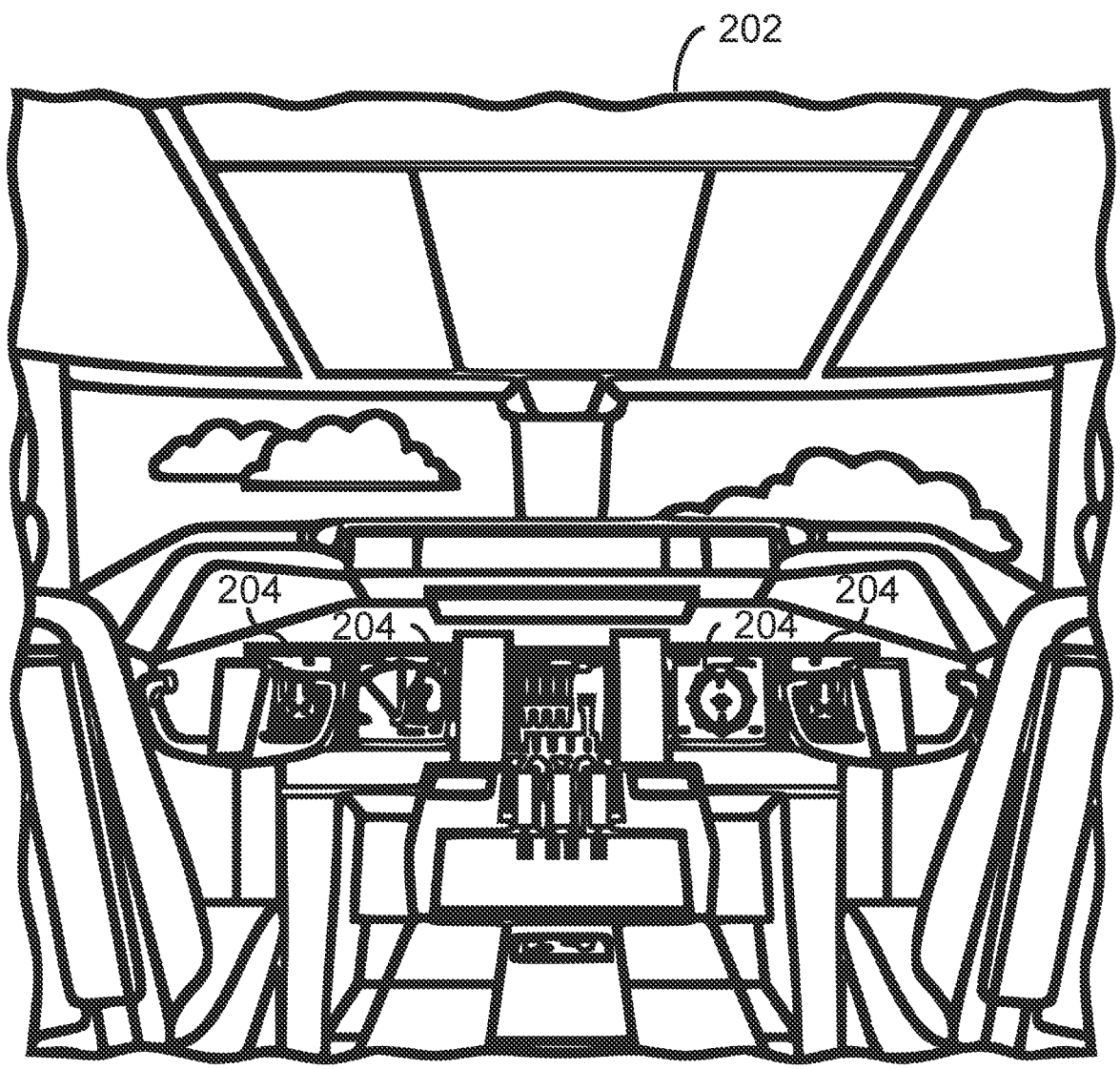
FIG. 2 depicts a schematic illustration of an aircraft cockpit, in accordance with one or more embodiments of the present disclosure.

Referring now to FIG. 2, a schematic illustration of an aircraft 200 cockpit 202 is shown according to an exemplary embodiment of the inventive concepts disclosed herein. The cockpit 202 may include one or more flight displays 204. In embodiments, the flight displays 204 may provide an output from an onboard aircraft-based weather radar system, LIDAR system, infrared system or other system on an aircraft. For example, the flight displays 204 may include a weather display, a weather radar map, and a terrain display. In embodiments, the flight displays 204 may provide an output based on a combination of data received from multiple external systems or from at least one external system and an onboard aircraft-based system. The flight displays 204 may include an electronic display or a synthetic vision system (SVS). For example, the flight displays 204 may include a display configured to display a two-dimensional (2-D) image, a three-dimensional (3-D) perspective image of terrain and/or weather information, or a three-dimensional (3-D) display of weather information or forecast information combined with forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

Figure 3:
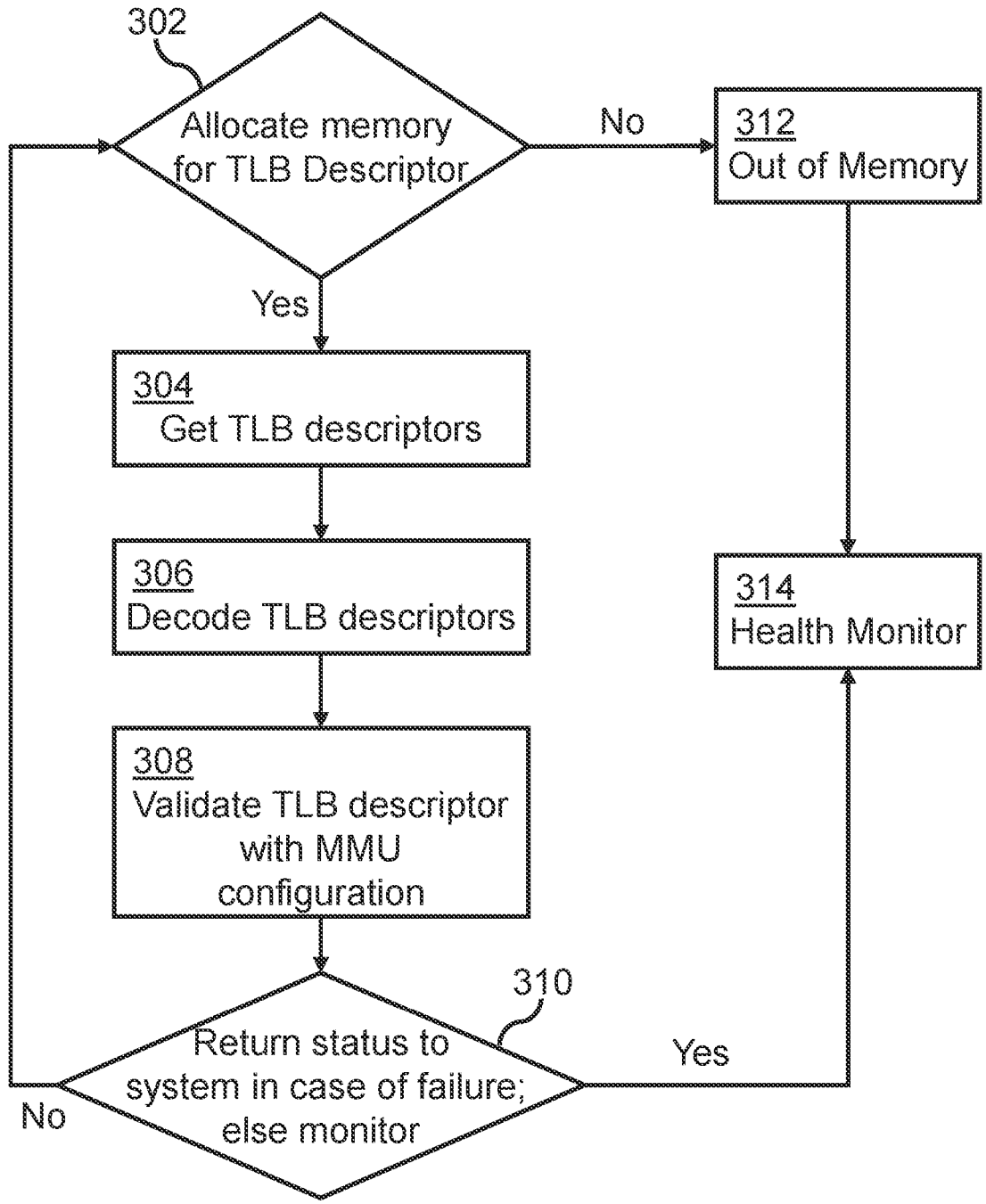
FIG. 3 depicts a flow diagram of a method, in accordance with one or more embodiments of the present disclosure.

Referring now to FIG. 3, a flow diagram of method 300 is described, in accordance with one or more embodiments of the present disclosure. The embodiments and the enabling technology described previously herein in the context of the microprocessor 102 should be interpreted to extend to the method. For example, the method may be implemented by the microprocessor. The method 300 may also be considered one or more steps of the software monitor 116. It is further recognized, however, that the method is not limited to the microprocessor and the monitor function.

In a step 302, memory is allocated for the TLB descriptors 128. The memory is ECC protected. The ECC protected memory may be the system memory 104, on-chip memory (e.g., the cache 114), or another cache.

If there is sufficient memory, the method 300 may continue to a step 304. If there is insufficient memory, the method 300 may continue to a step 312.

In step 304, the TLB descriptors 128 are retrieved. Retrieving the TLB descriptor 128 may also be referred to as getting the TLB descriptors 128. The TLB descriptors 128 may be retrieved from TLB data registers. The TLB descriptors 128 may be retrieved and then stored in the allocated memory location. In this regard, the step 304 may include copying the descriptors 128 from non-ECC protected memory into ECC protected memory.

In a step 306, the TLB descriptors 128 are decoded.

In a step 308, the TLB descriptors 128 are validated with the MMU configuration 118. Validating the TLB descriptors 128 with the MMU configuration 118 may include checking that the TLB descriptors 128 match the MMU configuration 118. A valid status is raised when the TLB descriptors 128 matches the MMU configuration 118. An error is raised when the TLB descriptors 128 do not match the MMU configuration 118. The error indicates system failure (e.g., the soft error in the TLB 112).

In a step 310, the error status is returned in case of failure. The error status is returned to one or more components of the microprocessor 102. For example, the error status may be returned to a health monitor 314. The status is delegated to the health monitor 314 such that the health monitor 314 may take appropriate action to remedy the soft error (e.g., flush the TLB 112; reset the microprocessor 102, and the like). In case no failure is detected, the method 300 repeats. The method 300 may continue to monitor the TLB descriptors 128 for the soft errors. For example, the method 300 may be iteratively performed in a background task of the CPU cores.

In a step 312, the memory is out of memory. In this regard, the step 302 does not have sufficient memory to allocate for the TLB descriptors 128. Out of memory may be a corner condition when the memory does not include enough memory to copy the descriptors into a safe location. In response to being out of memory, the method 300 may provide an out of memory status indication to the health monitor 314.

The health monitor 314 is a central location that monitors health. The health monitor 314 may periodically look at status bits and log faults. The health monitor 314 may take appropriate action upon receiving a status message indicating an error. For example, the health monitor 314 may reboot the microprocessor 102 and log the reboot as occurring due to the error. In some embodiments, the health monitor 314 may be executed by the CPU cores, although this is not intended to be limiting.

Figure 4:
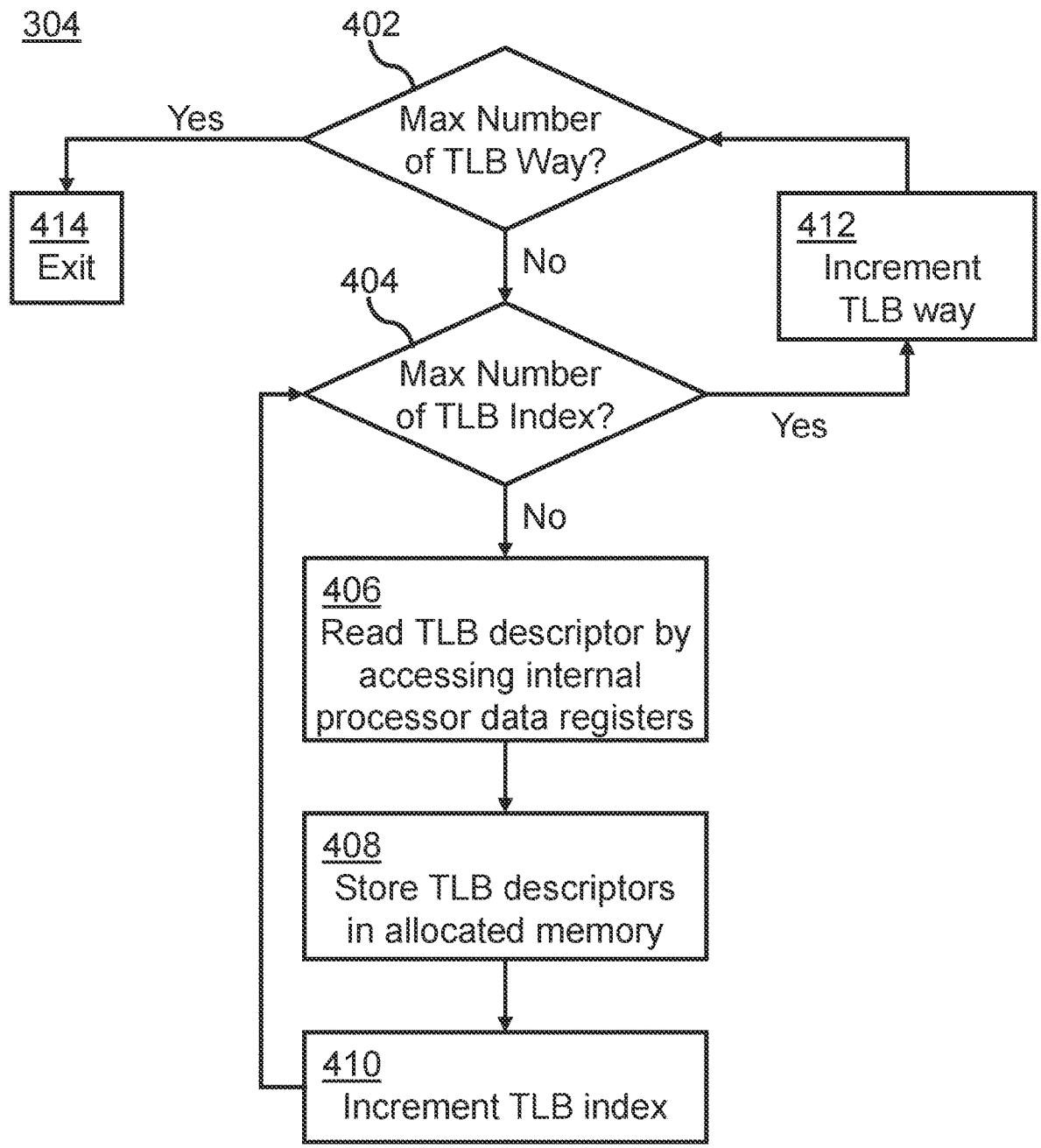
FIG. 4 depicts a flow diagram of a step of getting a TLB descriptor, in accordance with one or more embodiments of the present disclosure.

Referring now to FIG. 4, a flow diagram of the step 304 of getting the TLB descriptor 128 is described, in accordance with one or more embodiments of the present disclosure. The step 304 may include reading the TLB descriptors 128 from the processor registers for each way and each index by accessing the internal processor data registers.

In a step 402, a check is made to determine whether the maximum number of TLB 112 way been reached. If the maximum number of the TLB 112 way has been reached, then proceed to step 414 and exit. If the maximum number of the TLB 112 way has not been reached, then proceed to step 404. The TLB 112 way is a subdivision of a cache. Each way has an equal size and is indexed in the same fashion. Multiple ways are multiple arrays that can be indexed to the same level.

In a step 404, a check is made to determine whether the maximum number of TLB 112 indexes have been reached. If the maximum number of the TLB 112 indexes has been reached, then increment the TLB way in a step 412 and return to the step 402. If the maximum number of the TLB 112 indexes has not been reached, then proceed to step 406. The index is a part of the memory address that determines in which line of the cache the address can be found.

In a step 406, the TLB descriptor 128 is read by accessing internal processor data registers.

In a step 408, the TLB descriptor 128 is stored in the allocated memory location. For example, the TLB descriptor 128 may be stored in the ECC protected memory location.

In a step 410, the TLB index is incremented, then proceed to step 404.

Figure 5:
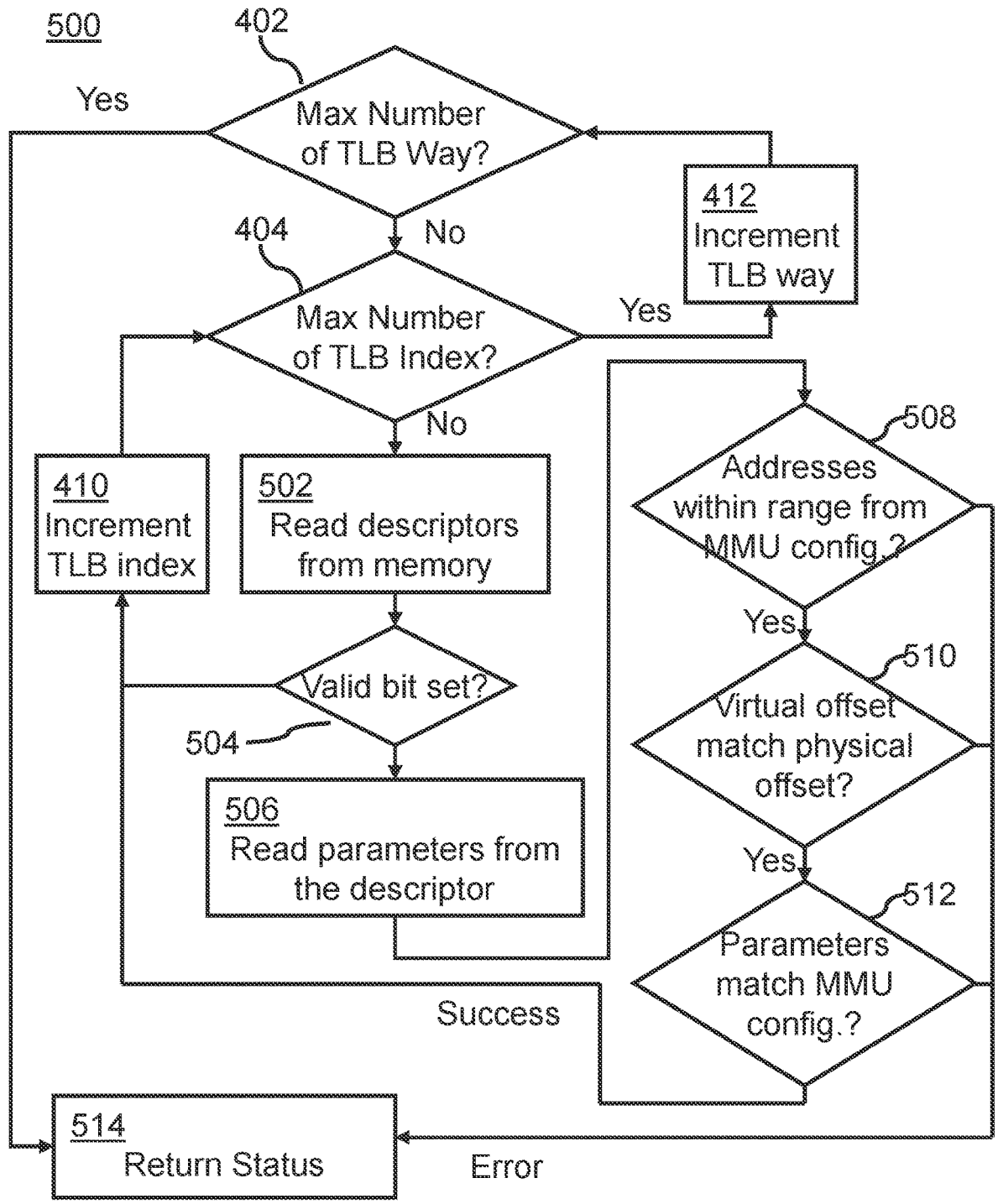
FIG. 5 depicts a flow diagram of a method, in accordance with one or more embodiments of the present disclosure.

Referring now to FIG. 5, a flow diagram of method 500 is described, in accordance with one or more embodiments of the present disclosure. The method 500 may be a method of the steps 306 and 308 of decoding the descriptor and validating with the MMU configuration. The method 500 may repeat through the entries of the TLB 112 until the entries are validated or invalidated.

In the step 402, a check is made to determine whether the maximum number of TLB 112 way been reached. If the maximum number of the TLB 112 way has been reached, then proceed to step 514 and return a status. If the maximum number of the TLB 112 way has not been reached, then proceed to step 404.

In the step 404, a check is made to determine whether the maximum number of TLB 112 indexes been reached. If the maximum number of the TLB 112 indexes has been reached, then increment the TLB way in a step 412 and return to the step 402. If the maximum number of the TLB 112 indexes has not been reached, then proceed to step 502.

In a step 502, the TLB descriptors 128 are read from memory. The TLB descriptors 128 are read from the ECC protected memory.

In a step 504, a check is made to determine whether a bit in the descriptors is set to valid. The valid bit indicates that the entry in the TLB 112 is actively used. An invalid bit indicates that the entry is not valid. For example, the entry may be invalidated due to never being used. If the valid bit is set, then proceed to a step 506. If the valid bit is not set, then proceed to the step 410 and increment the TLB index. If this is a valid entry, then compare entry against master configuration data.

In as step 506, parameters are read from the descriptor. The parameters may include a physical address, a size, a virtual address, a shareability, an execution permission, a security permission, and/or a memory type. Each of the parameters may be defined by one or more bits of the descriptor.

In a step 508, addresses from the TLB descriptor are checked to be within the range of addresses from the MMU configuration 118. The step 508 may include checking whether the physical and virtual address obtained from the TLB descriptor falls within the range of physical and virtual address defined in the MMU configuration 118. If the physical and virtual address of the TLB descriptor do not fall within the range of physical and virtual address ranges defined in the MMU configuration 118, then the memory regions have been shifted and proceed to step 514 of returning an error status. If the physical and virtual address of the TLB descriptor do fall within the range of physical and virtual address ranges defined in the MMU configuration 118, then proceed to step 510.

In a step 510, the virtual page offset is compared with the physical page offset within the memory range. The step 510 may also be referred to as determining whether the page is in the correct offset within the memory region. The step 510 checks whether the offsets are the same within the overall memory region. If the virtual page offset matches the physical page offset, then the page is in the correct offset and proceed to step 512. If the virtual page offset does not match the physical page offset, then the page has been shifted within the memory region and proceed to step 514 of returning an error status.

The offset is the microregion within the overall region. For example, the region may include 128 pages within a region. A wrong offset within the region may point to the wrong data within actual memory. The step 510 may include determining the page is within the correct slot in the memory region. One or more calculations may be performed to determine offsets are correct.

In a step 512, if any of the fields in the descriptor don't match the global static parameters for the MMU, proceed to step 514 of returning an error status. The fields may include, but are not limited to, shareability 128d, execution permissions 128e, security permissions 128f, and/or memory type 128g. If each of the fields in the descriptor do match the global static parameters for the MMU, proceed to step 410 and increment the TLB index.

In a step 514, the status of the TLB 112 is returned. The status may include a success if the descriptors 128 are validated with the MMU configuration 118. The status includes the success if each of the steps 508, 510, and 512 are successful. The status may include an error if one or more of the descriptors 128 are invalidated with the MMU configuration 118. The status may include the error if the checks in any of the steps 508, 510, and 512 fail. The status is delegated to the microprocessor 102 to take appropriate action. For example, the microprocessor 102 may implement the previously described soft error handling in response to receiving the error (e.g., reset, flush, etc.).

In some embodiments, the steps 508, 510, and 512 may immediately proceed to the step 514 upon the failure. In this regard, not all entries may be checked for validity upon detecting the errors.

Referring generally again to FIGS. 1A-5.

In embodiments, virtual machines (not depicted) can be operated on the computer system 100 to perform many different functions. The virtual machines are platform-independent instruction set that allows a user a portable programming environment. Multiple virtual machines can run on the microprocessor 102 through sharing or partitioning of the operations of the microprocessor 102. When multiple virtual machines are operating on the microprocessor 102, each virtual machine has its own operating time. There must be isolation between the multiple virtual machines to avoid interaction between them. Partitioning is isolating the two or more virtual machines running on the microprocessor 102.

In some instances, the error detected may impact one or more of the virtual machines but may not impact all of the virtual machines operating on the microprocessor 102. In embodiments, resetting the microprocessor 102 may refer to resetting copies of the virtual machine which are detected to have an error with the TLB. The microprocessor 102 does not reset copies of the virtual machines which do not have the error. In this regard, operation of the virtual machines without the error may remain uninterrupted.

The methods, operations, and/or functionality disclosed may be implemented as sets of instructions or software readable by a device. The steps may include computations which may be performed simultaneously, in parallel, or sequentially. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/ or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. For example, the program instructions may include a frequency selection algorithm, an HF mission planner, and the like.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A microprocessor comprising:
a memory management unit (MMU) comprising a page table and a translation lookaside buffer (TLB); wherein the page table maps virtual memory to physical memory; wherein the TLB comprises entries from the page table; wherein each of the entries comprises descriptors; wherein the TLB is maintained in non-error correcting code (ECC) memory;
wherein the MMU is configured according to a plurality of MMU configuration parameters; and
one or more CPU cores configured to execute a software monitor function, the software monitor function causing the one or more CPU cores to:
copy the descriptors from the TLB to ECC memory;
determine a valid bit of the descriptors is set; and
compare the descriptors in the ECC memory with the plurality of MMU configuration parameters to determine whether the TLB has a soft error.

2. The microprocessor of claim 1, wherein comparing the descriptors with the plurality of MMU configuration parameters comprises:
determining whether a virtual address and physical address from the descriptors is within a range of virtual addresses and a range of physical addresses from the plurality of MMU configuration parameters;
comparing a virtual page offset with a physical page offset; and
matching at least one of shareability, execution permissions, security permissions, or memory type from the descriptors with the plurality of MMU configuration parameters.

3. The microprocessor of claim 2, wherein the software monitor function returns an error when the virtual address and the physical address from the descriptors are not within the range of virtual addresses and the range of physical addresses from the plurality of MMU configuration parameters.

4. The microprocessor of claim 2, wherein the software monitor function returns an error when the virtual page offset is not matched with the physical page offset.

5. The microprocessor of claim 2, wherein the software monitor function returns an error when at least one of the shareability, the execution permissions, the security permissions, or the memory type from the descriptors do not match with the plurality of MMU configuration parameters.

6. The microprocessor of claim 2, wherein the execution permissions and the memory type from the descriptors are matched with the plurality of MMU configuration parameters.

7. The microprocessor of claim 6, wherein the shareability, the execution permissions, and the memory type from the descriptors are matched with the plurality of MMU configuration parameters.

8. The microprocessor of claim 6, wherein the execution permissions, the security permissions, and the memory type from the descriptors are matched with the plurality of MMU configuration parameters.

9. The microprocessor of claim 6, wherein the shareability, the execution permissions, the security permissions, and the memory type from the descriptors are matched with the plurality of MMU configuration parameters.

10. The microprocessor of claim 1, the software monitor function causing the one or more CPU cores to allocate memory in the ECC memory for the descriptors.

11. The microprocessor of claim 1, the software monitor function causing the one or more CPU cores to reboot the microprocessor in response to detecting an error in the descriptors.

12. The microprocessor of claim 1, the software monitor function causing the one or more CPU cores to flush the TLB in response to detecting an error in the descriptors.

13. The microprocessor of claim 1, wherein the page table is a multi-level page table.

14. The microprocessor of claim 1, comprising a cache comprising the software monitor function.

15. A computer system comprising:
   system memory; and
   a microprocessor coupled to the system memory, the microprocessor comprising:
      a memory management unit (MMU) comprising a page table and a translation lookaside buffer (TLB); wherein the page table maps virtual memory to physical memory; wherein the TLB comprises entries from the page table; wherein each of the entries comprises descriptors; wherein the TLB is maintained in non-error correcting code (ECC) memory;
      wherein the MMU is configured according to a plurality of MMU configuration parameters; and
      one or more CPU cores configured to execute a software monitor function, the software monitor function causing the one or more CPU cores to:
         copy the descriptors from the TLB to ECC memory;
         determine a valid bit of the descriptors is set; and
         compare the descriptors in the ECC memory with the plurality of MMU configuration parameters to determine whether the TLB has a soft error.

16. The computer system of claim 15, wherein the computer system is one of a flight display, an avionic panel, or a flight control computer.

17. The computer system of claim 15, wherein the ECC memory is the system memory.

* * * * *